Sept. 5, 1967   L. B. CARR   3,339,650
CONVEYOR WEIGHING SCALE
Filed Aug. 10, 1964   3 Sheets-Sheet 1
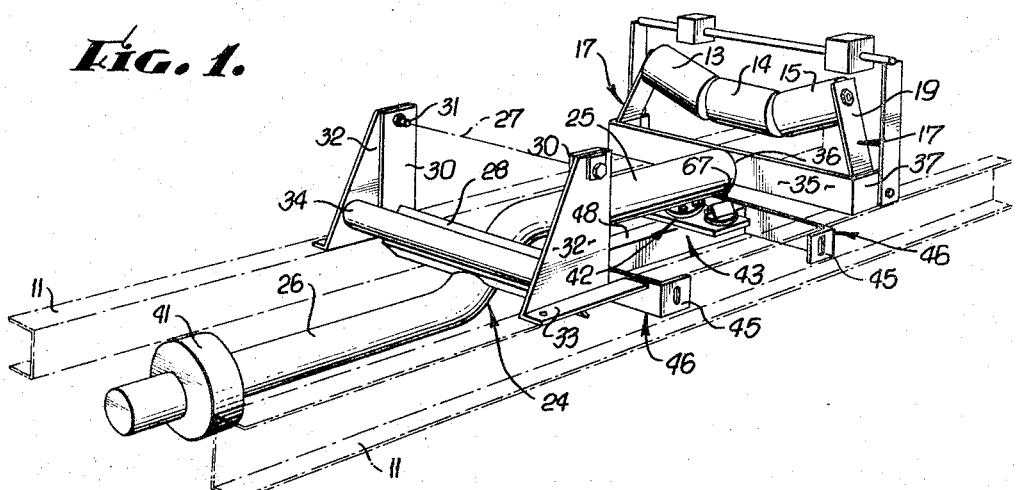
FIG. 1.
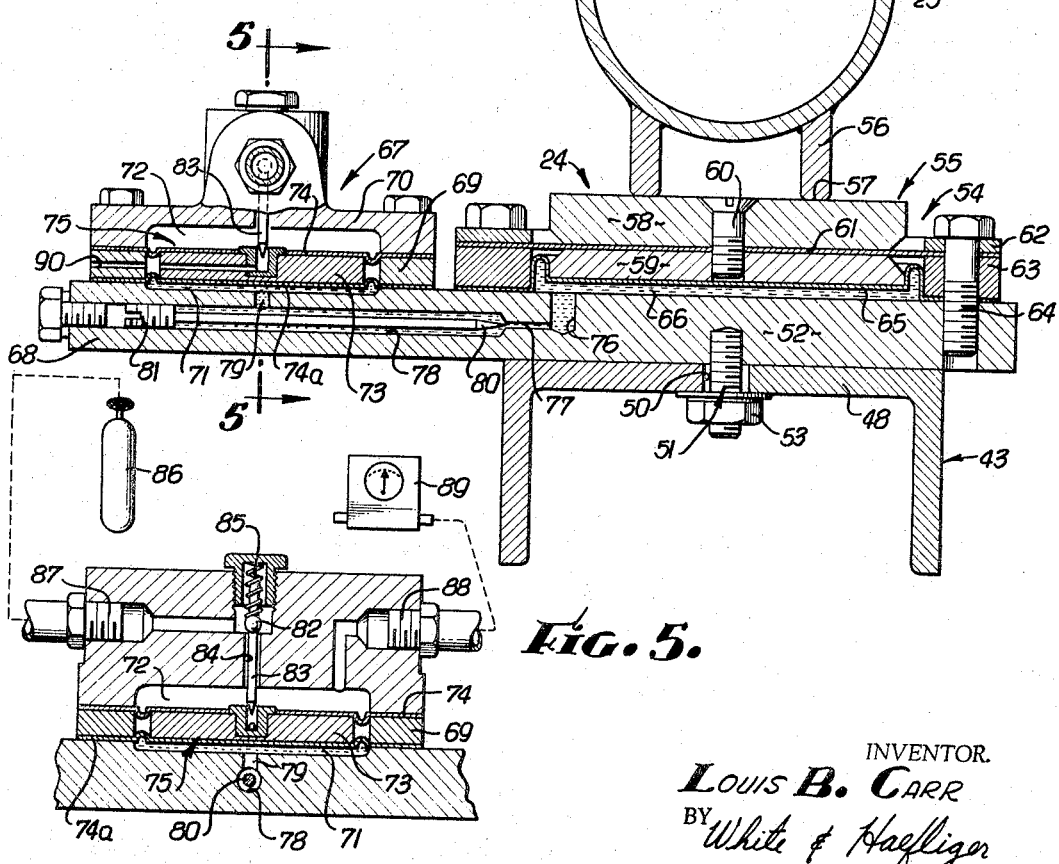
FIG. 4.
FIG. 5.
INVENTOR.
LOUIS B. CARR
BY White & Haefliger
ATTORNEYS.

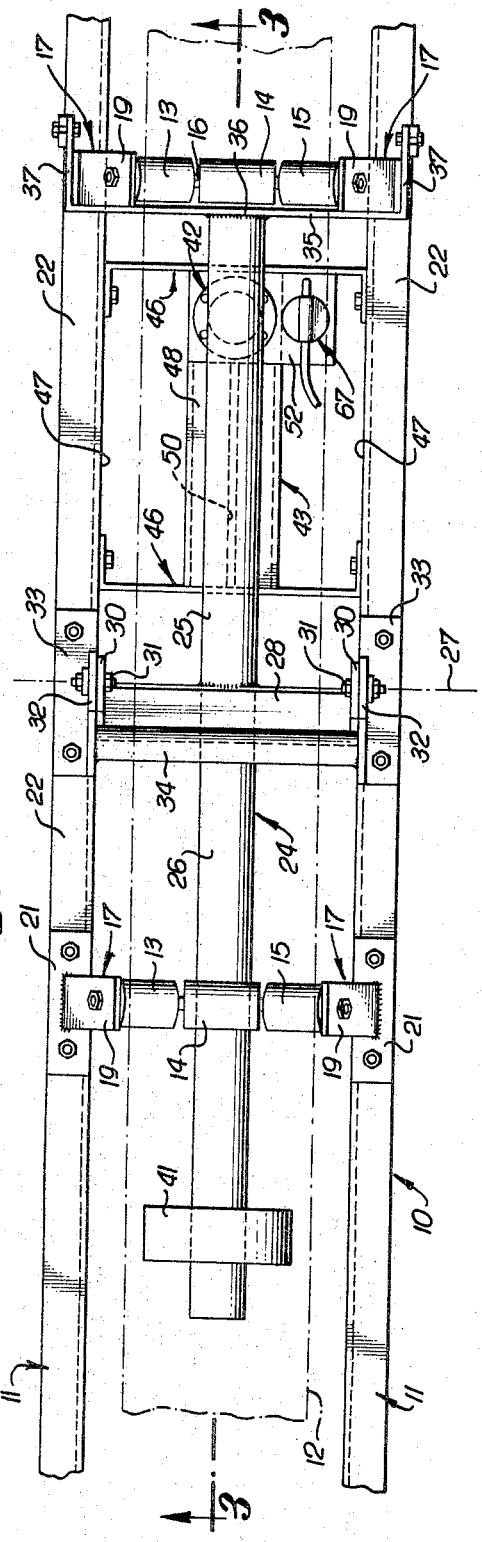

Sept. 5, 1967 L. B. CARR 3,339,650
CONVEYOR WEIGHING SCALE
Filed Aug. 10, 1964 3 Sheets-Sheet 3
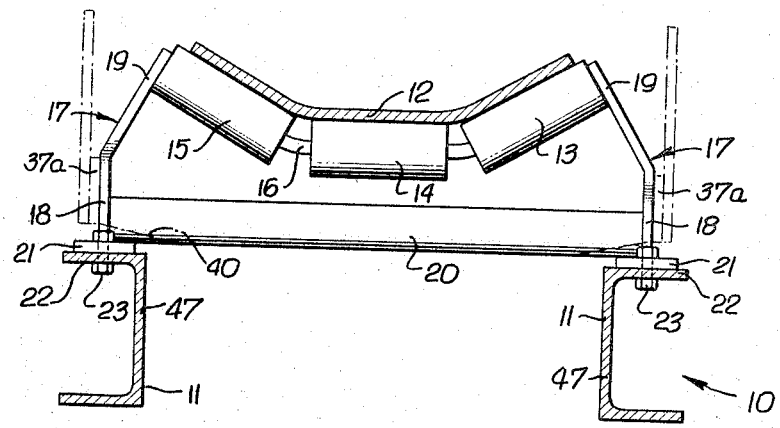
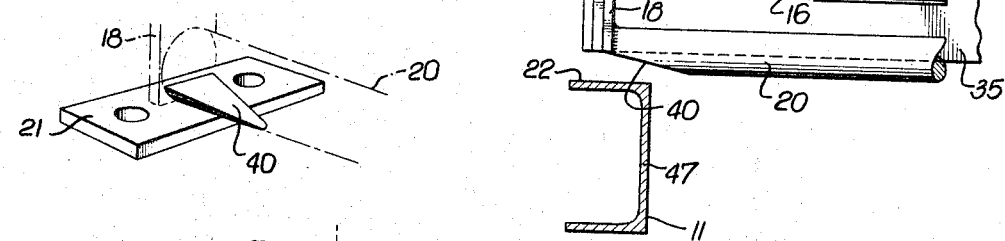
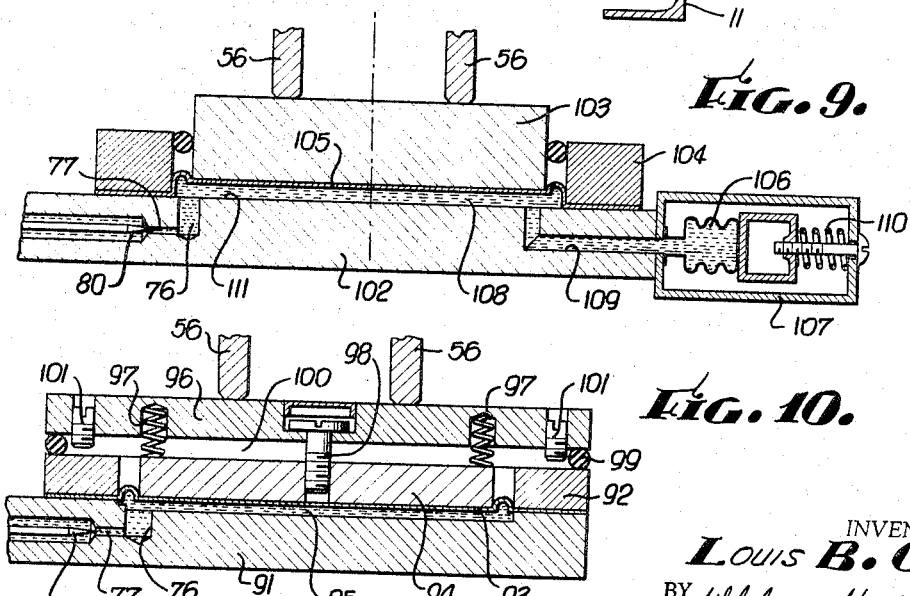
INVENTOR.
LOUIS B. CARR
BY White & Haefliger
ATTORNEYS.

United States Patent Office 3,339,650
Patented Sept. 5, 1967

3,339,650
CONVEYOR WEIGHING SCALE
Louis B. Carr, Cloudcroft, N. Mex., assignor, by mesne assignments, to Automated Equipment Corporation
Filed Aug. 10, 1964, Ser. No. 388,506
4 Claims. (Cl. 177—16)

This invention relates generally to continuous weighing systems, and more particularly has to do with improvements in continuous weighing scales operable in combination with belt conveyor systems.

In the past there has existed a need for a weighing scale incorporating that combination of advantageous features found in the present device. Among these desirable features are included the absence of delicate parts, the lack of need for complex mounting structure and cumbersome protective enclosure for the weighing scale, a capacity for rapid connection to an existent belt conveyor system without serious structural disturbance thereof, a provision for rapid calibration of the load detecting unit or cell, and other features and advantages which will appear in the following description.

It is a major object of the invention to provide a continuous weighing scale incorporating all of the above listed advantages and which is adapted for rapid combination with an installed belt-type conveyor system having a conveyor frame, a belt idler, and a support through which the idler is supported by the conveyor frame. Basically, the improved scale comprises a pivoting frame and means to carry it for pivoting movement relative to the conveyor frame, the pivoting frame having a portion located for connection to the idler support to independently carry the latter and the idler after the support is freed from the conveyor frame. As a result the pivoting frame is then freed to pivot with the idler in response to variations in the weight of the belt transported material imposed on the idler, and means is provided to detect such pivoting movement in order that the weight variations may be detected.

More specifically, the pivoting frame is provided with a bracket portion located for connection to a selected pair of idler support legs which are spaced from the belt and which are part of the conveyor system. The legs are then freed from their normal attachment to the conveyor system and become a part of the weighing scale along with the leg supported idler. Furthermore, the amount of force transmitted by frame pivoting for detection by a load cell may be varied in a novel manner in order to calibrate the detection in relation to a given or predetermined variation in weight imposed on the pivoting frame. To this end the load cell is made adjustably interconnected with an auxiliary frame connectible to the conveyor frame, and in such manner that the load cell may be bodily moved generally parallel to and beneath one elongated stretch of the pivoted frame which carries the idler support legs.

Other advantages and features include the provision of a liquid containing load cell chamber having a plunger remaining presented to receive loading imposed by the one stretch of the pivoting frame over a predetermined range of movement of the cell relative to said one stretch, whereby plunger force to produce a given liquid pressure may be rapidly and easily selected or calibrated in relation to the pivoted frames; the provision of converter means carried with the load cell chamber for bodily movement along said frame stretch, and operable to convert liquid pressure variations to gas pressure variations, the latter being detectable at a remote location; and the provision of novel and unusual cell overload protective means.

These and other objects and advantages of the invention, as well as the details of an illustrative embodiment, will be more fully understood from the following detailed description of the drawings, in which:

FIG. 1 is a perspective showing of a belt conveyor system with the weighing apparatus of the invention combined therewith;
FIG. 2 is a plan view of the conveyor system and weighing apparatus;
FIG. 3 is a side elevation of the apparatus as seen in FIG. 2;
FIG. 4 is an enlarged vertical section taken on line 4—4 of FIG. 3;
FIG. 5 is a section taken on line 5—5 of FIG. 4;
FIG 6 is a vertical section taken through the conveyor system at an idler location and showing the idler support attached to the conveyor rails or beams;
FIG. 7 is a fragmentary showing similar to FIG. 6 and illustrating the manner in which the pivoting frame may be connected to the idler support and the latter freed from the conveyor system;
FIG. 8 is a perspective illustrating the manner of freeing the idler support from the conveyor rail;
FIG. 9 is an enlarged section taken through a modified load cell; and
FIG. 10 is an enlarged vertical section taken through another modified load cell.

Referring first to FIGS. 1–3 and also FIG. 6, the conveyor system includes a conveyor frame generally seen at 10 and typically comprising two parallel rails 11, a conveyor belt 12 traveling generally parallel to the rails, belt idlers 13, 14 and 15 at each of a series of stations along the conveyor, and support means for the idlers at each station. Typically, the support means may include an axle 16 for the idlers, and a pair of support legs 17 through which weight imposed on the idlers by material carried on the belt is transmitted to the conveyor frame. As seen in FIG. 6, the axle 16 etxends generally transversely with shallow U-shape whereby the belt becomes cradled by the idlers for carrying material in the trough formed by the belt. In this regard, the belt may have flat extent to carry the material. Also, the legs 17 typically include upright portions 18 and angle portions 19, the latter being connected to the axle terminals. A cross bar or tube 20 typically interconnects the leg portions 18 at each station as best seen in FIG. 6, and the leg portions 18 are typically connected through feet 21 with the top flanges 22 of the conveyor rails 11, fasteners 23 for example providing the connection.

Referring now to the weighing apparatus, it basically comprises what may generally be referred to as a pivoting frame 24 typically including one tubular stretch 25 projecting toward the idler station seen in FIG. 1, and another stretch 26 projecting oppositely. These stretches are generally located beneath the belt 12 and in and above the space formed between the conveyor rails 11, the pivot axis being indicated at 27 in FIGS. 1 and 2. As seen therein, and also in FIG. 3, the pivoting frame includes a cross piece 28 attached to an angled and merging region 29 of the stretches 25 and 26 whereby the former stretch extends generally horizontally at a higher elevation than the latter. The cross piece 28 has its transverse terminals connected to uprights 30 best seen in FIGS. 1 and 3 as being pivot connected at 31 to the fixed supports 32. The latter are mounted at 33 to the top flange 22 of the conveyor frame, and they are also interconnected by a transverse tube 34 spaced above the stretch 26 of the pivoting frame.

The pivoting frame 24 has a forward portion located for connection to the idler support 17 to independently carry the support and the idler assembly 13, 14 and 15 after the support 17 is freed from the conveyor frame, in order that the pivoting frame may then be freed to vary force transmission to the load cell in response to variations in the weight of belt transported material imposed on the idler assembly. As seen in FIGS. 1–3 and 7, said portion located for connection to the idler support comprises a bracket 35 joined at 36 to the terminal of stretch 25. The generally U-shaped bracket has arms 37 joined as by welding to the idler support leg uprights 18 as best seen in FIG. 7, this joinder being readily accomplished while the legs 17 at a selected idler station remain attached to the conveyor frame rails 11. For example, as seen in FIG. 6, broken lines 37a indicate the reception of the arms of the bracket 35 at the outer sides of the legs 18 and adjacent thereto in position for weld or other connection therewith.

Following this attachment, the legs 18 of the idler support 17 may be freed from the conveyor frame, as for example is illustrated in FIGS. 7 and 8. As there shown, a cut is made along the planes 40 angled inwardly and downwardly through the lower portions of the legs 18 and cross piece 20, but above the support feet 21, whereby the latter may then be removed as by detaching the fasteners 23 leaving the apparatus in the condition shown in FIG. 7. The pivoting frame is then free to exert variable downward loading in response to variations in the weight of belt transported material imposed on the idlers 13, 14 and 15.

FIGS. 1–3 also show a counterbalancing weight 41 slidable along the tubular stretch 26 in order to achieve a condition of near balance of the pivoting frame when the belt is unloaded, i.e., carries no material. For example, a predetermined tare loading of the empty belt may result in a small output of the load sensing device. As a result, the pivoting frame is unbalanced beyond the empty belt loading only by the weight of the material acting downwardly on the idler assembly for weighing purposes. Note also that the upwardly exposed surface extents of the frame 24 at lengthwise opposite sides of axis 27 are approximately equal. Therefore, dust collection on such extents will not unbalance the frame.

Regarding such weighing, means is provided to detect variable loading exerted via the pivoting frame in order that weight variations of material being transported by the belt may be detected. For this purpose, such means may comprise a load cell generally indicated at 42 located directly below the pivoting frame stretch 25 in order that downward loading exerted thereby may be communicated to the cell. Means is also provided to support the cell for receiving such loading transmitted by the pivoting frame, this latter means typically including an auxiliary frame 43 independently connectible to the conveyor frame, as for example by fasteners 44 joining the arms 45 of the auxiliary frame brackets 46 to the vertical flanges 47 of the conveyor rails 11. The longitudinally spaced brackets 46 are interconnected by and support a plate 48 carrying the load cell 42, an adjustable interconnection being provided for accommodating bodily movement of the cell generally parallel to the stretch 25 of the pivoting frame, and relative thereto, to adjust the amount of loading transmitted to the cell by the pivoting frame in response to a predetermined variation in the weight imposed on the pivoting frame. As seen in FIGS. 2–4, this adjustable interconnection may be provided by a lengthwise slot 50 in the plate 48 to receive a tongue in the form of a fastener 51 depending from the base 52 of the load cell. Accordingly, the cell may be slipped along and above the plate 48 when the fastener 51 is loosened, and when the cell arrives at selected position the fastener nut 53 may be tightened to clamp the load cell on the plate 48 in the selected position.

Referring to the load cell construction, it is seen in FIG. 4 to comprise a chamber 54 of which the base plate 52 is a part, the chamber also having a plunger unit 55 remaining presented upwardly to receive loading imposed by downward pivoting of the stretch 25, such presentation of the plunger continuing throughout a predetermined range of movement of the load cell relative to or along the stretch 25. In this regard, skids 56 extend in the space between the stretch 25 and the plunger 55 to provide a sliding connection therebetween, the skids as shown being attached to the stretch 25 and depending therefrom for sliding at the upper face location 57 of the plunger.

Referring to the detailed construction, the plunger comprises upper and lower plates 58 and 59 held together by a fastener 60 with a diaphragm 61 clamped therebetween and extending outwardly beyond the periphery of the plunger for retention between upper and lower rings 62 and 63, the latter being connected to the base 52 by fasteners 64. Liquid is confined below the plunger between a seal 65 and the base plate 52, for pressurization by the plunger, the liquid being indicated at 66. Accordingly, the diaphragm 61 keeps the plunger centered and keeps dust out of contact with seal 65.

Loading of the plunger is communicated to the liquid 66 as pressure variations, and these are in turn communicated to converter means operable to detect the pressure variations. In the form of the invention shown, the converter means is generally designated at 67 as carried with the load cell chamber for bodily movement relative to the pivoting frame stretch 25, and for this purpose the converter means typically includes a portion 68 of the base plate 52 which projects laterally from the load cell. Said portion 68 of the base plate comprises a part of a converter means hollow body, the remainder typically being formed by the immediate plate 69 and a cap 70. Diaphragm means within the hollow body defines gas and liquid sub-chambers typically designated at 71 and 72 at opposite sides of the diaphragm means, the latter including the intermediate plate 73 and the upper and lower diaphragm 74 and 74a. The liquid sub-chamber 71 communicates with the load cell chamber liquid 66 whereby pressure variations are communicated to one side of the diaphragm means 75 of the converter. Such communication typically is established through ports 76, 77, 78 and 79, a needle valve 80 being adjustable at 81 to control the port 77 for adjustably damping the pressure variation communication to the sub-chamber 71.

Means is also provided for metering gas under pressure to increase and decrease gas admission to the sub-chamber 72 in response to opposite movements of the diaphragm means 75 in correspondence with liquid pressure variations, to the end that a change in liquid pressure exerted on one side of the diaphragm means 75 results in a balancing change in gas pressure exertion on the opposite side of the diaphragm means. The metering effect is produced, for example, by the valve ball 82 seen in FIG. 5 as mounted on the stem 83 to control the port 84 through which gas pressure is admitted to the sub-chamber 72. The stem 83 is raised or lowered by the diaphragm means 75, so that as the liquid pressure in the sub-chamber 71 increases, the ball 82 is raised against the tension in a spring 85 to admit more gas pressure to the sub-chamber 72 in order to balance the diaphragm means. A gas pressure source is indicated at 86 in FIG. 5 to supply gas under pressure to the inlet 87 communicating with the ball controlled port 84. Gas pressure is communicated through the outlet 88 to the meter 89 to register the change in gas pressure occurring within the sub-chamber 72. FIG. 4 shows a suitable bleed port 90 communicating with the space between the diaphragms 74 and 74a to vent gas entering said space.

Referring now to FIG. 10, a modified load cell is indicated to include a base plate 91 and a spacer ring 92 together with a diaphragm 93 and a plunger 94 forming a chamber for receiving liquid 95. The plunger 94 carries yieldable means as for example the plate 96 and springs 97 for transmitting imposed body loading between the skids 56 of the stretch 25 and the plunger 94. The springs 97 are preloaded by the preloading screw 98 attaching the plate 96 to the plunger 94, there being a dust seal 99 covering the screw 98. A flexible dust seal 99 also extends between the plate 96 and the plunger 94 at the periphery of the gap 100 therebetween. The yieldable means such as the plate 96 also includes a stop to limit plunger actuating movement thereof under overload conditions. Such a stop may take the form of the stop screws 101 carried by the plate 96 and spaced from the top of the plunger 94 as seen in FIG. 10, the screws engaging the spacer ring 92 at overload conditions to prevent further pressurization of the liquid 95.

Referring to FIG. 9, the load cell comprises a base plate 102 which forms a liquid chamber with the plunger 103, spacer ring 104 and the sealing diaphragm 105. Yieldable means in the form of a bellows 106 is provided, typically within a sub-chamber 107, to receive pressurized liquid 108 in the load cell chamber when the liquid is displaced therefrom under overload conditions. Such displacement occurs through the port 109 and expands the bellows against the compression of a preloaded spring 110 until the diaphragm 105 seats against the surface 111 of the base plate 102.

I claim:

1. In weighing apparatus for combination with an installed belt-type conveyor system having a conveyor frame, the improvement comprising a pivoting frame and port legs through which weight imposed on the idler by material carried on the belt is transmitted to the conveyor frame, the improvement comprising a pivoting frame and means to carry the pivoting frame for transmitting variable loading, the frame having a pivot axis extending generally transversely relative to the lengthwise direction of the belt, said axis being spaced from said idler in said direction, said pivoting frame having a bracket portion located for connection to the idler support legs in spaced relation to the belt to independently carry said legs and the idler with material weight imposed thereon by the belt whereby the pivoting frame is free to pivot with said idler in response to variations in the weight of belt transported material imposed on the idler, said pivoting frame having stretches extending at opposite sides of said axis in said lengthwise direction, a load cell and means supporting said cell to receive loading transmitted by the pivoting frame for detecting said weight variations, said load cell comprising a liquid containing chamber having a plunger remaining presented to receive loading imposed by one of said stretches. movement of the plunger in response to loading variations being communicated by said liquid as pressure variations, stop means to limit plunger actuating movement under overload conditions, and including converter means to detect said liquid pressure variations, said cell having ducting forming at least one restriction in the path of liquid pressure variation communication to said converter means thereby to damp said communication, said converter means being carried with said chamber for simultaneous bodily movement relative to said one stretch, said converter means comprising a hollow body and diaphragm means therein defining gas and liquid sub-chambers respectively at opposite sides of the diaphragm means, the liquid sub-chamber communicating with said load cell chamber whereby liquid pressure variations are communicated to one side of said diaphragm means, means for metering gas under pressure to increase and decrease gas admission to the gas sub-chamber in response to opposite loading exerted on the diaphragm means in correspondence with liquid pressure variations whereby a change in liquid pressure exertion on said one side of the diaphragm results in a balancing change in gas pressure exertion on the opposite side of the diaphragm, and means to maintain gas flowing to said metering means and to detect changes in the gas pressure exerted at the diaphragm.

2. The improvement as recited in claim 1 in which said means supporting said cell includes an auxiliary frame independently connectible to the conveyor frame to locate the load cell beneath one of said stretches which is connected to said bracket portion, said auxiliary frame and load cell being adjustably interconnected for accommodating bodily movement of the cell generally parallel to said one stretch and relative thereto to adjust the loading transmitted to said cell by said pivoting frame in response to a predetermined variation in the weight imposed on said pivoting frame, said pivoting frame including counterbalancing means.

3. The improvement as defined in claim 1 including yieldable means to receive pressurized liquid displaced from the chamber under overload conditions.

4. In weighing apparatus for combination with an installed belt-type conveyor system having a conveyor frame, a belt, an idler for the belt and spaced idler support legs through which weight imposed on the idler by material carried on the belt is transmitted to the conveyor frame, the improvement comprising a pivoting frame and means to carry the pivoting frame for transmitting variable loading, the frame having a pivot axis extending generally transversely relative to the lengthwise direction of the belt, said axis being spaced from said idler in said direction, said pivoting frame having a bracket portion located for connection to the idler support leg in spaced relation to the belt to independently carry said legs and the idler with material weight imposed thereon by the belt after said legs are freed from the conveyor frame, whereby the pivoting frame is then freed to pivot with said idler in response to variations in the weight of belt transported material imposed on the idler, said pivoting frame having stretches extending at opposite sides of said axis in said lengthwise direction, a load cell and means supporting said cell to receive loading transmitted by the pivoting frame for detecting said weight variations, said means supporting said cell including an auxiliary frame independently connectible to the conveyor frame to locate the load cell beneath one of said stretches which is connected to said bracket portion, said auxiliary frame and load cell being adjustably interconnected for accommodating bodily movement of the cell generally parallel to said one stretch and relative thereto to adjust the loading transmitted to said cell by said pivoting frame in response to a predetermined variation in the weight imposed on said pivoting frame, said pivoting frame including counterbalancing means, said load cell comprising a liquid containing chamber having a plunger remaining presented to receive loading imposed by said one stretch over a predetermined range of movement of said cell relative to said stretch, movement of the plunger in response to loading variations being communicated to said liquid as pressure variations, and including converter means to detect said liquid pressure variations, and yieldable means carried by the plunger for transmitting imposed loading between said one stretch and said plunger, said yieldable means having a stop to limit plunger actuating movement thereof under overload conditions.

References Cited
UNITED STATES PATENTS

| | | | |
|---|---|---|---|
| 1,074,123 | 9/1913 | Kinne | 198—39 X |
| 2,521,876 | 9/1950 | Stake | 198—39 X |
| 2,521,877 | 9/1950 | Cheeseman et al. | 198—39 X |
| 2,662,539 | 12/1953 | Markson | 177—208 X |
| 2,882,036 | 4/1959 | Lyons | 198—39 X |
| 2,990,937 | 7/1961 | Goslin | 198—39 |
| 3,163,248 | 12/1964 | Farquhar | 198—39 X |

RICHARD B. WILKINSON, *Primary Examiner.*

STEPHEN J. TOMSKY, *Examiner.*

G. H. MILLER, JR, *Assistant Examiner.*

UNITED STATES PATENT OFFICE
CERTIFICATE OF CORRECTION

Patent No. 3,339,650                      September 5, 1967

Louis B. Carr

It is hereby certified that error appears in the above numbered patent requiring correction and that the said Letters Patent should read as corrected below.

Column 5, lines 24 and 25, strike out "the improvement comprising a pivoting frame and port" and insert instead -- a belt, an idler for the belt and spaced idler support --.

Signed and sealed this 19th day of November 1968.

(SEAL)
Attest:

Edward M. Fletcher, Jr.                      EDWARD J. BRENNER
Attesting Officer                              Commissioner of Patents